(12) United States Patent
Chen et al.

(10) Patent No.: US 8,148,966 B2
(45) Date of Patent: Apr. 3, 2012

(54) POWER SUPPLY CONTROL CIRCUITS INCLUDING ENHANCED RAMP PULSE MODULATION

(75) Inventors: Gang Chen, Hong Kong (CN); Tod F. Schiff, Portland, OR (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 65 days.

(21) Appl. No.: 12/862,414

(22) Filed: Aug. 24, 2010

(65) Prior Publication Data
US 2012/0049824 A1   Mar. 1, 2012

(51) Int. Cl.
*G05F 1/575* (2006.01)
*G05F 1/618* (2006.01)
(52) U.S. Cl. .................. 323/284; 323/283; 323/288
(58) Field of Classification Search .............. 323/282, 323/283, 284, 285, 288
See application file for complete search history.

(56) References Cited

U.S. PATENT DOCUMENTS

| | | | |
|---|---|---|---|
| 5,959,443 A * | 9/1999 | Littlefield | 323/287 |
| 7,233,134 B2 * | 6/2007 | Huang et al. | 323/284 |
| 7,508,183 B2 * | 3/2009 | Chen | 323/288 |
| 7,595,617 B2 | 9/2009 | Schiff | |
| 7,764,054 B1 * | 7/2010 | Guo et al. | 323/224 |
| 7,969,134 B2 * | 6/2011 | Chen | 323/285 |

* cited by examiner

*Primary Examiner* — Gary L Laxton
(74) *Attorney, Agent, or Firm* — Polansky & Associates, P.L.L.C.

(57) ABSTRACT

A power supply control circuit includes a latch including a first latch input for receiving a first logic signal, a second latch input for receiving a second logic signal, and a latch output for providing an output signal. The power supply control circuit further includes a controller coupled to the first and second latch inputs. The controller is configured to generate the first logic signal based on an error signal and a threshold signal and in response to an off-time signal to control timing between pulses in the output signal. The controller is further configured to select one of the error signal and the threshold signal and to generate the second logic signal based on a ramp signal and the one of the error signal and the threshold signal to control a width of the pulse.

20 Claims, 7 Drawing Sheets

US 8,148,966 B2

POWER SUPPLY CONTROL CIRCUITS INCLUDING ENHANCED RAMP PULSE MODULATION

FIELD

The present disclosure is generally related to power supply control circuits, and more particularly, but not by limitation, to power supply control circuits including ramp pulse modulation.

BACKGROUND

Two types of power supply control circuits are constant on time (COT) circuits and ramp pulse modulation (RPM) circuits. A COT circuit operates at a relatively fixed frequency without a clock. Typically, the COT circuit controls a switch such that its on-time varies inversely with the input voltage. The COT circuit initiates an on time period when the feedback voltage falls below a reference voltage. The switch remains on for a programmed on-time, causing the feedback voltage to rise above the reference voltage. After the on-time period, the switch remains off until the feedback voltage falls below the reference voltage.

An RPM circuit uses a ramp signal, such as a triangular or sawtooth waveform, that is compared to an error signal. The result of the comparison controls the pulse widths of pulses within an output signal, creating a duty signal for controlling a gate driver. An example of such an RPM circuit is described below with respect to FIG. 1.

While RPM circuits typically provide more accurate output regulation and less overshoot during load step-down transient events than COT circuits, conventional RPM circuits experience large variations in switching frequency because the ripple and perturbation in the output signal of the error amplifier result in variation of the on-time. Moreover, in the steady-state operation, jitter is present in frequency and in pulse width. Such jitter can introduce power supply variations, which can impact performance of associated circuitry.

BRIEF DESCRIPTION OF THE DRAWINGS

In the following description, the use of the same reference numerals in different drawings indicates similar or identical items.

DETAILED DESCRIPTION OF ILLUSTRATIVE EMBODIMENTS

Embodiments of control circuits are described below with respect to FIGS. 3 and 5-7 that provide enhanced ramp pulse modulation (RPM) having reduced switching frequency variation and reduced jitter. In an embodiment, a control circuit uses two voltage thresholds defining a normal operation window for an error signal, and adjusts the on-time of the PWM pulse using a ramp signal and one of a threshold signal and the error signal depending on the value of the error signal relative to the two thresholds. When the error signal stays in the normal operation window, the on time of the PWM pulse is determined by the threshold signal and the ramp signal. When the error signal exceeds the normal operation window, the on time of the PWM pulse is determined by the error signal and the ramp signal. Before discussing the above-mentioned embodiments in detail, a conventional power supply control system that uses an RPM technique is described below with respect to FIGS. 1 and 2.

Figure 1:
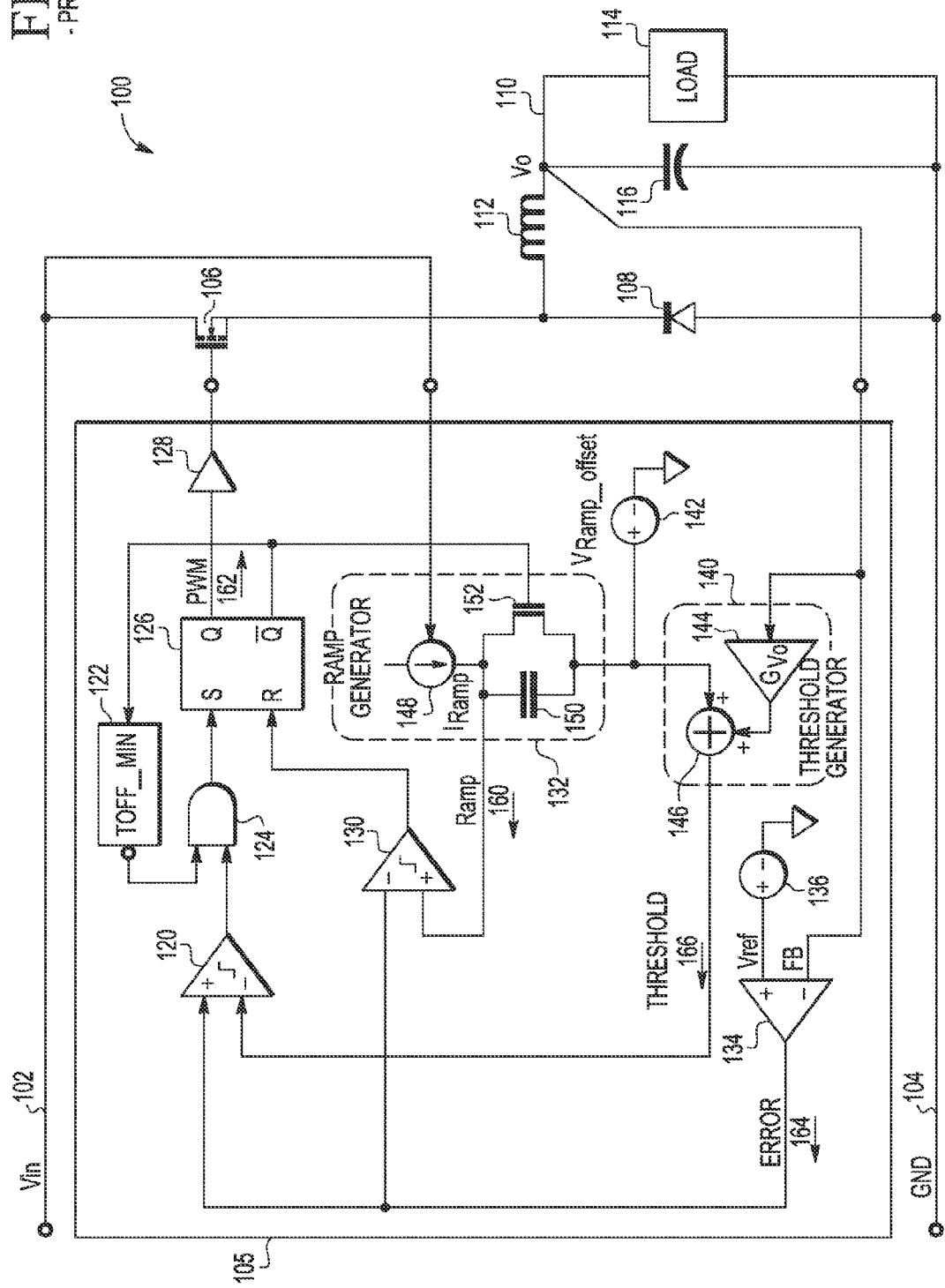
FIG. 1 is a diagram of a representative example of a conventional power supply control system.

FIG. 1 is a diagram of a representative example of a conventional power supply control system 100. Power supply control system 100 includes a first power supply terminal 102 (Vin) and a second power supply terminal 104 (GND). First power supply terminal 102 delivers a power supply to a power control circuit 105 that in conjunction with additional components forms a buck converter configured to deliver power to a load circuit 114. Power supply control system 100 includes a transistor 106 having a first current electrode connected to first power supply terminal 102, a control electrode connected to power control circuit 105, and a second current electrode connected to an inductor 112 and to a cathode of diode 108. Inductor 112 includes a second terminal connected to an output terminal 110 that is connected to load circuit 114. Diode 108 includes an anode connected to second power supply terminal 104. In an alternative embodiment, diode 108 may be replaced by a metal oxide semiconductor field effect transistor (MOSFET) operating as a synchronous rectifier.

Power supply control system 100 further includes a filter capacitor 116 including a first electrode connected to output terminal 110 and a second electrode connected to second power supply terminal 104. A voltage potential across capacitor 116 represents an output voltage, which is provided to a load 114.

Power control circuit 105 includes comparators 120 and 130, an AND gate 124, a PWM latch 126, a minimum off time circuit 122 (Toff_min), a driver circuit 128, an error amplifier 134, a ramp generator 132, and a threshold generator 140. Ramp generator includes a first terminal connected to first power supply terminal 102, a second terminal connected to a positive input of comparator 130, and a third terminal connected to threshold generator 140. Ramp generator 132 includes a current source 148 configured to produce a ramp current ($I_{RAMP}$). Current source 148 is connected to a first current electrode of transistor 152, which has a control electrode connected to a first terminal of minimum off time circuit 122 and a second current electrode connected to threshold generator 140. Ramp generator 132 further includes a capacitor 150 including a first electrode connected to the first current electrode of transistor 152 and to the positive input of comparator 130 and including a second electrode connected to the second current electrode of transistor 152.

Threshold generator 140 includes an amplifier 144 having an input connected to output terminal 110 for receiving the output voltage (Vo) as a feedback voltage (FB) and an output for producing a scaled version of the output voltage (Vo). Threshold generator 140 includes a summing node 146 including a first input connected to the second current electrode of transistor 152 and to an offset voltage 142 and a second input connected to the output of amplifier 144. Summing node 146 includes an output terminal connected to a negative input of comparator 120. Summing node 146 produces a threshold signal 166, which is generally a DC voltage in a steady state, in response to receiving a signal from offset voltage 142 and in response to receiving the scaled version of the output voltage (Vo) from amplifier 144.

Comparator 120 includes a positive input connected to an output of error amplifier 134. Comparator 130 includes a negative input connected to the output of error amplifier 134. Error amplifier 134 includes a negative input connected to output terminal 110 to receive a feedback signal (FB) and includes a positive input connected to voltage reference 136 to receive a reference voltage (Vref). Error amplifier 134 generates an error signal 164 in response to the feedback signal and the reference voltage and provides the error signal 164 to the positive input of comparator 120 and the negative input of comparator 130.

Comparator 130 includes an output connected to a reset input of PWM latch 126. Comparator 120 includes an output connected to a first input of AND gate 124, which includes a second input connected to an output of minimum off time circuit 122 (Toff_min). AND gate 124 further includes an output connected to a set input of PWM latch 126.

PWM latch 126 includes a Q-output connected to an input of driver circuit 128, which has an output connected to the control electrode of transistor 106. PWM latch 126 further includes an inverted Q-output connected to the control electrode of transistor 152 and to the first terminal of minimum off time circuit 122 (Toff_min). The minimum off time circuit 122 provides an off time signal that controls the turn on time for applying the comparator output signal from comparator 120 to ensure a minimum off time (S) after each on time before presenting the comparator output signal to PWM latch 126. While PWM latch 126 is depicted as a set/reset latch, other types of logic devices, such as flip-flops, clocked buffer circuits, or other sequential logic devices may be used. In the illustrated example, PWM latch 126 has a first latch input connected to the output of AND gate 124, a second latch input connected to the output of comparator 130, and an output connected to driver circuit 128 for providing PWM output signal 162.

In operation, comparator 120 generates a comparator output signal when the error signal 164 crosses or exceeds the threshold signal 166. When the minimum off time circuit 122 presents a logical "one" value or "logic high" value to AND gate 124, the comparator output signal from comparator 120 controls the output of AND gate 124 to produce a logic signal, which is applied to the set input of PWM latch 126 to initiate an edge transition within PWM signal 162. Error amplifier 134 monitors a difference between an output feedback voltage (FB) and a voltage reference (Vref), and provides the error signal 164. The PWM set signal at the set input of PWM latch 126 becomes valid once the error signal 164 crosses over threshold signal 166. When the output signal from minimum off time circuit 122 is at a logic high level, the comparator output of comparator 120 controls the timing of rising edge transitions within the PWM output signal 162.

PWM latch 126 resets when ramp signal 160 crosses over the error signal 164, controlling the pulse width or timing of falling edge transitions within PWM output signal 162. Thus, within power control circuit 105, the relative values of the ramp signal 160 and the error signal 164 determine the reset timing of the PWM latch 126. The relative values of the error signal 164, the threshold signal 166, and the minimum off time (s) determine the value at the set input of PWM latch 126. Representative examples of ramp signal 160, PWM output signal 162, error signal 164, and threshold signal 166 of FIG. 1 are described below with respect to FIG. 2.

Figure 2:
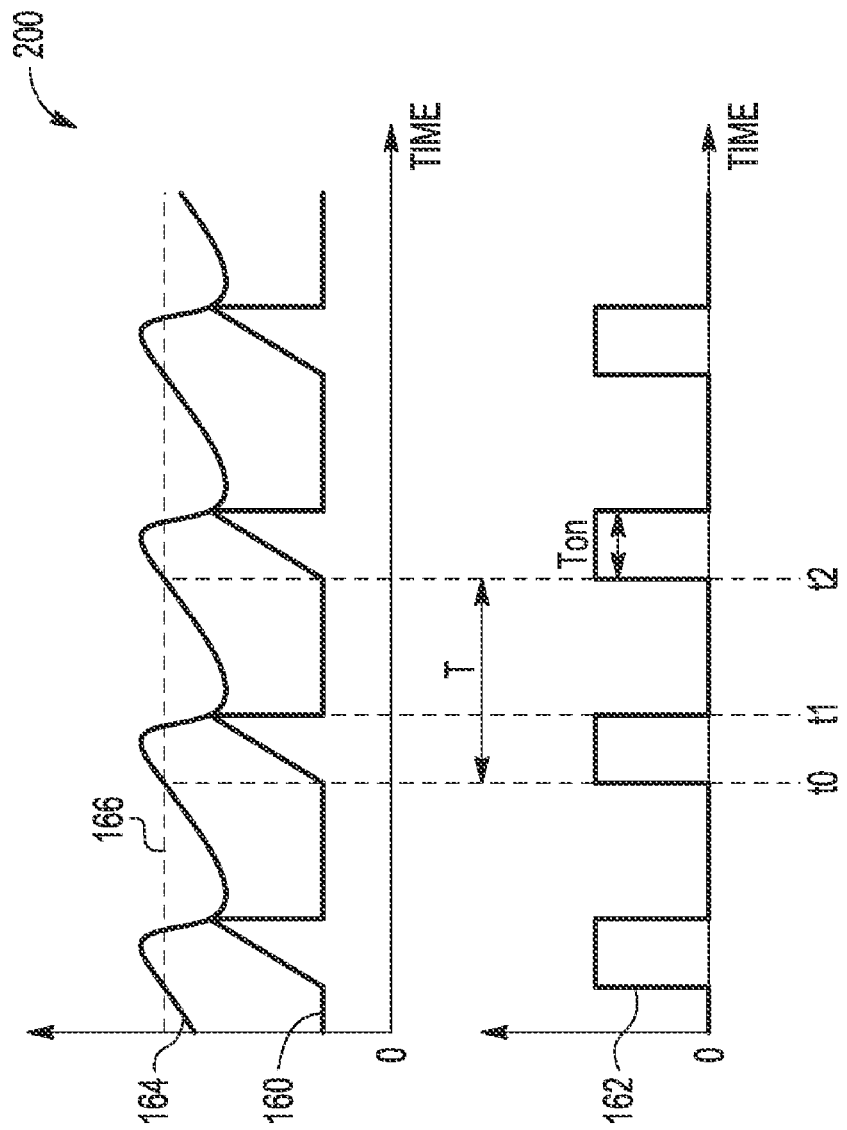
FIG. 2 is a timing diagram of an example of voltage signals generated by portions of the power supply control system of FIG. 1.

FIG. 2 is a timing diagram 200 of an example of voltage signals generated by portions of the power supply control system 100 of FIG. 1. In timing diagram 200, the vertical axis represents voltage in volts, and the horizontal axis represents time in seconds. Timing diagram 200 includes ramp signal 160, PWM output signal 162, error signal 164, and threshold signal 166. In the illustrated example, a rising edge transition of a PWM pulse of PWM output signal 162 corresponds to a time (e.g., t0 and t2) when error signal 164 crosses over the threshold signal 166. The falling edge transition of a PWM pulse of PWM output signal 162 corresponds to a time (e.g., t1) when ramp signal 160 reaches a level of the error signal 164.

While the conventional power control circuit 105 in FIG. 1 uses the error signal 164 to control the switching frequency and the on time of pulses within PWM output signal 162, such a configuration can be susceptible to changes in operating conditions. In particular, variations in input voltage levels, output voltage levels, and load characteristics, variations in system parameters (such as inductance, output capacitance, effective series resistance of output capacitors, parameters of compensation networks, etc.), and noise can impact the operating conditions, changing the ripple in the error signal 164 and thereby changing the timing of the edge transitions. In particular, such perturbations in the error signal 164 result in variation of on time and variation of switching frequency of transistor 106. In steady-state operation, jitter within the PWM output signal 162 exists in the frequency and the pulse widths of the PWM output signal 162. An example of a circuit configured to adaptively adjust the on time of the PWM signal is described below with respect to FIG. 3 for reducing variation of the switching frequency and jitter during normal operation.

Figure 3:
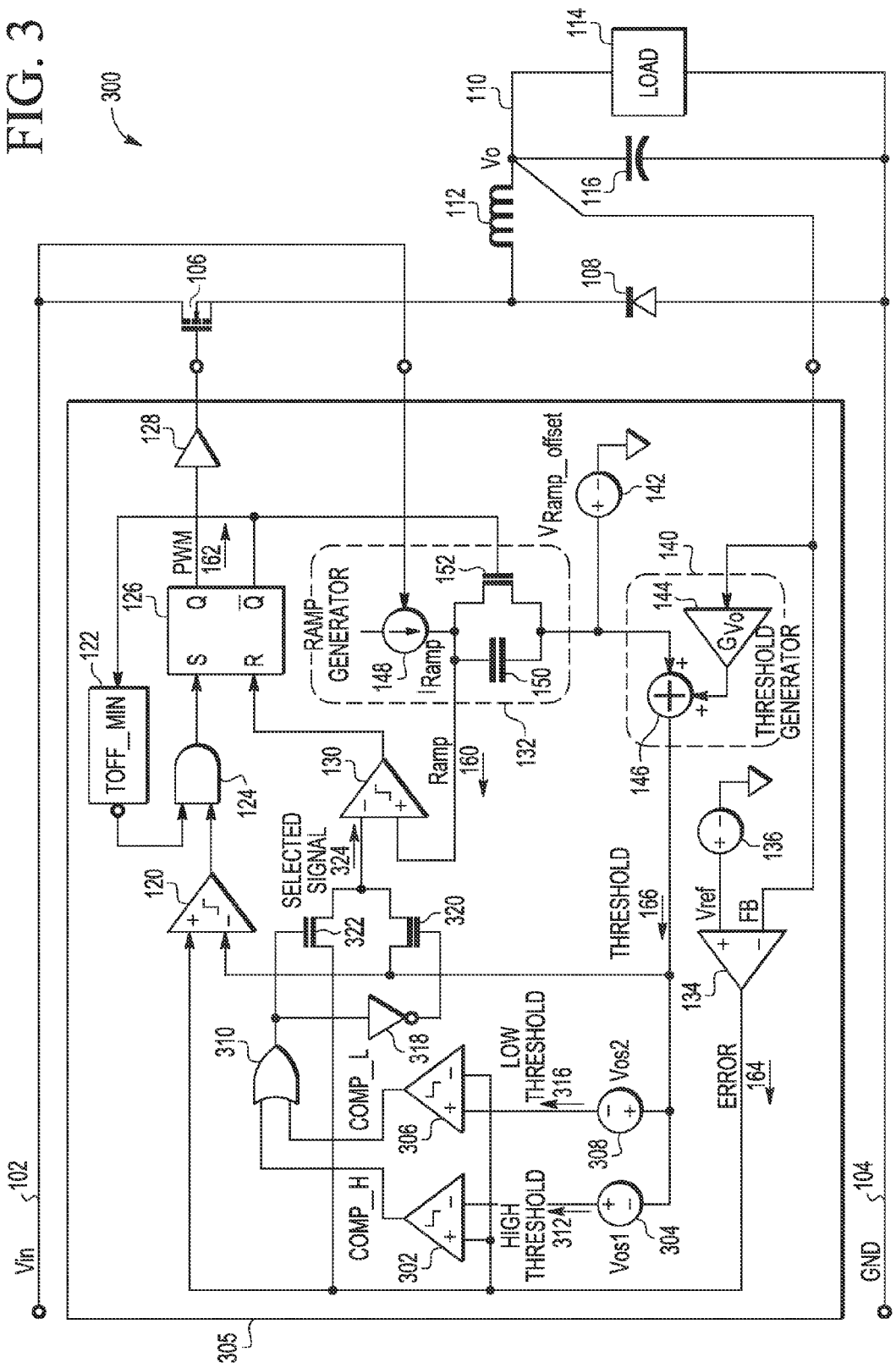
FIG. 3 is a diagram of an embodiment of a portion of a power supply control system with enhanced ramp pulse modulation.

FIG. 3 is a diagram of an embodiment of a power supply control system 300 with enhanced ramp pulse modulation. Power supply control system 300 includes a power control circuit 305, which includes much of the same circuitry as that described above with respect to FIG. 1. Power supply controller 305 further includes control circuitry in front of the negative input of comparator 130 to selectively provide one of the error signal 164 and the threshold signal 166 to the negative input.

Power supply controller 305 includes comparators 302 and 306, first offset voltage 304, second offset voltage 308, an OR gate 310, inverter 318, and transistors 320 and 322. Comparator 302 includes a positive input connected to the output of error amplifier 134 to receive error signal 164. Comparator 302 further includes a negative input connected to first offset voltage 304, which is offset from threshold signal 166 to produce a high threshold 312. In this configuration, comparator 302 compares the error signal 164 to the high threshold 312 and produces a logic high value at its output when the error signal 164 exceeds the high threshold 312.

Comparator 306 includes a negative input connected to the output of error amplifier 134 to receive error signal 164. Comparator 306 further includes a positive input that is connected to second offset voltage 308, which is offset from threshold signal 166 to produce a low threshold 316. In this configuration, comparator 306 compares the error signal 164 to the low threshold 316 and produces a logic high value at its output when the error signal 164 falls below the low threshold 316. Thus, high threshold 312 and low threshold 316 define an operating window, and a logic high value is presented to one of the inputs of OR gate 310 when the error signal 164 is outside of the operating window.

OR gate 310 includes a first input connected to the output of comparator 302, a second input connected to the output of comparator 306, and an output connected to a control electrode of transistor 322. Transistor 322 includes a first current electrode connected to the output of error amplifier 134 and a second current electrode connected to the negative input of comparator 130. Inverter 318 includes an input connected to the output of OR gate 310 and includes an output connected to a control electrode of transistor 320. Transistor 320 includes a first current electrode connected to summing node 146 and to the negative input of comparator 120 for receiving threshold signal 166 and a second current electrode connected to the second current electrode of transistor 322 and to the negative input of comparator 130.

In operation, the high threshold 312 and the low threshold 316 provide an operating window for the error signal 164. When the error signal 164 is within the operating window, the outputs of comparators 302 and 306 are low, and the output of OR gate 310 is low. Thus, OR gate 310 provides a logic low to the control electrode of transistor 322, turning it off. Inverter 318 inverts the output signal, turning on transistor 320 to connect the threshold signal 166 to the negative input of comparator 130 as the selected signal 324. In this instance, the on time of PWM output signal 162 is set by the ramp signal 160 and the threshold signal 166. In other words, the signal at the reset input of PWM latch 126 becomes valid when the ramp signal exceeds the threshold signal 166, instead of the error signal 164 (as in FIG. 1).

If the error signal 164 changes such that it falls outside of the operating window, such as during a transient event, one of the comparators 302 and 306 will produce a logic high output signal. In this instance, OR gate 310 will produce a logic high control signal, which turns on transistor 322 to provide the error signal 164 to the negative input of comparator 130 as the selected signal 324. Further, the logic high control signal at the output of OR gate 310 is inverted by inverter 318 to turn off transistor 320. Thus, power supply controller 305 controls the width of the pulse (the on time) based on the ramp signal 160 and the error signal 164 when the error signal is outside of the operating window. Since control of the pulse width varies according to value of the error signal 164 relative to high threshold 312 and the low threshold 316, power supply controller 305 operates as an adaptive RPM controller.

As compared to power control circuit 105 in FIG. 1, power supply controller 305 provides improved output regulation over line and load variations and a good transient response. Additionally, frequency variation and jitter are reduced in steady state operation. Further, power supply controller 305 is less susceptible to changes in operating conditions, system parameter variations, and noise. An example of voltage signals produced by portions of power supply controller 305 is described below with respect to FIG. 4.

Figure 4:
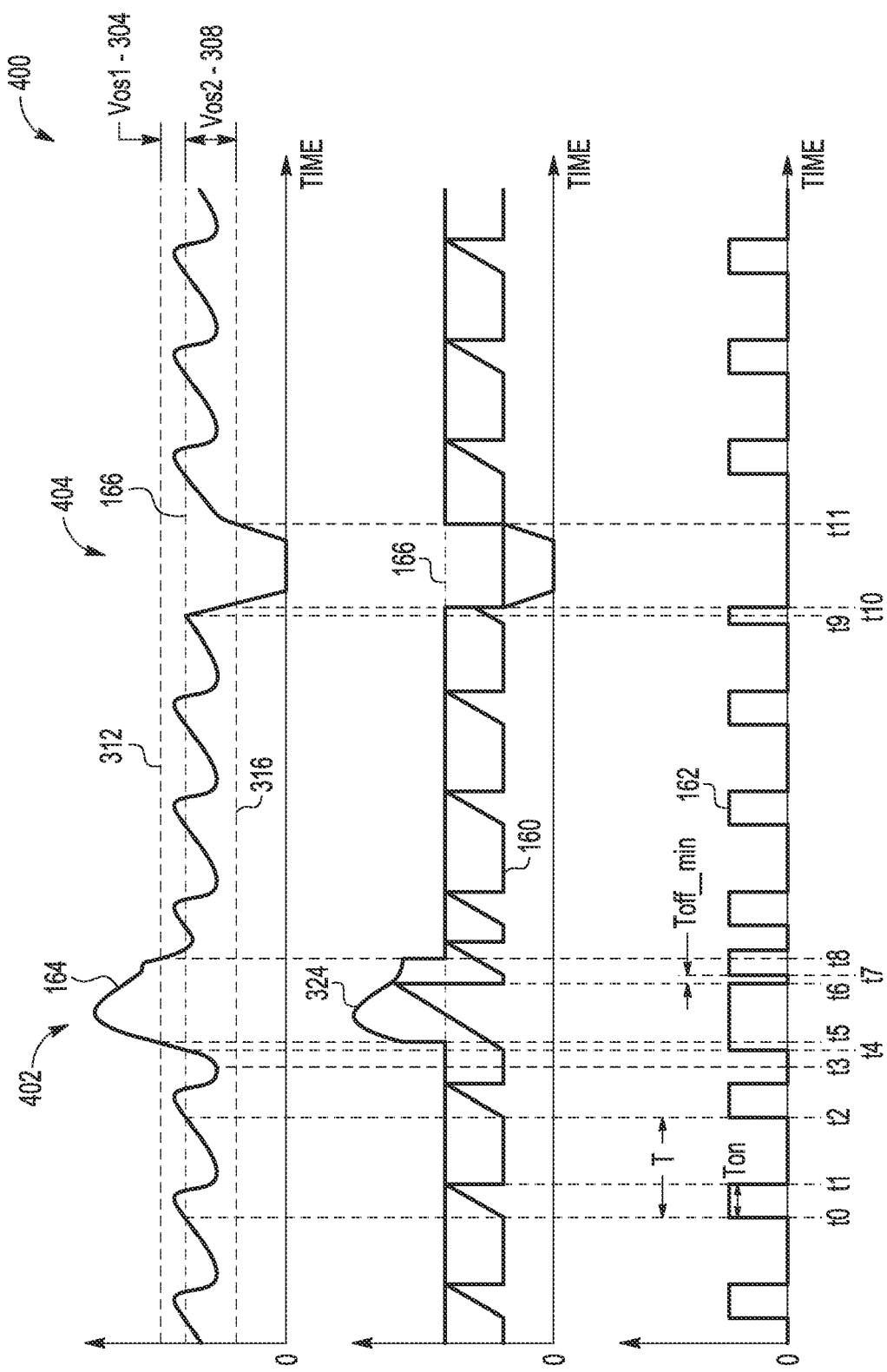
FIG. 4 is a timing diagram of an example of voltage signals that are generated by the portion of the power supply control system of FIG. 3.

FIG. 4 is a timing diagram 400 of an example of voltage signals that are generated by the power supply control system of FIG. 3. In timing diagram 400, the vertical axes represent volts, and the horizontal axes represent time. Timing diagram 400 includes threshold signal 166, which is a DC voltage in a steady state. Timing diagram 400 also includes high threshold 312 and low threshold 316, which are offset from the threshold signal 166 by first offset voltage 304 and second offset voltage 308, respectively. When error signal 164 falls within the operating window defined by the high threshold 312 and low threshold 316, the selected signal 324 is equal to the threshold signal 166. In this instance, the timing of when the error signal 164 crosses the threshold signal 166 determines the timing of the rising edge transition (e.g., t0, t2, and t4) of the PWM output signal 162, and the timing of the falling edge transitions (e.g., t1) is determined when the ramp signal 160 equals the threshold signal 166.

When error signal 164 crosses the high threshold (as generally indicated at 402) or the low threshold (as generally indicated at 404), the selected signal 324 equals the error signal 164. For example, if a load step-up transient is received at time t3, the error signal 164 increases quickly, crossing the threshold signal at time t4, producing the rising edge transition of PWM output signal 162. At time t5, the error signal 164 crosses the high threshold, and the selected signal 324 switches from the threshold signal 166 level to the error signal 164, so that the on-time of the pulses of the PWM output signal 162 increases and helps the output voltage (Vo) to increase to the regulated level rapidly.

In another example, when a load step-down transient is received, such as at time t9 after a pulse is initiated within PWM output signal 162, error signal 164 decreases immediately and falls below the low threshold 316 at time t10. In this instance, the selected signal 324 switches from the threshold signal 166 to track the error signal 164. By switching from the threshold signal 166 to the error signal 164, a pulse within PWM output signal 162 is turned off to reduce overshoot in the output voltage (Vo). At time t11 when the error signal 164 increases to a level that is within the operating window between the high threshold 312 and the low threshold 316, the selected signal 324 switches back to the threshold signal 166. Thus, power supply controller 305 operates as an adaptive on-time controller.

While FIGS. 3 and 4 depicted a power supply control system 300 and a timing diagram 400 of signals produced by the circuit, respectively, a similar result can be achieved using other circuit arrangements. An example of another embodiment of a power supply controller is described below with respect to FIG. 5.

Figure 5:
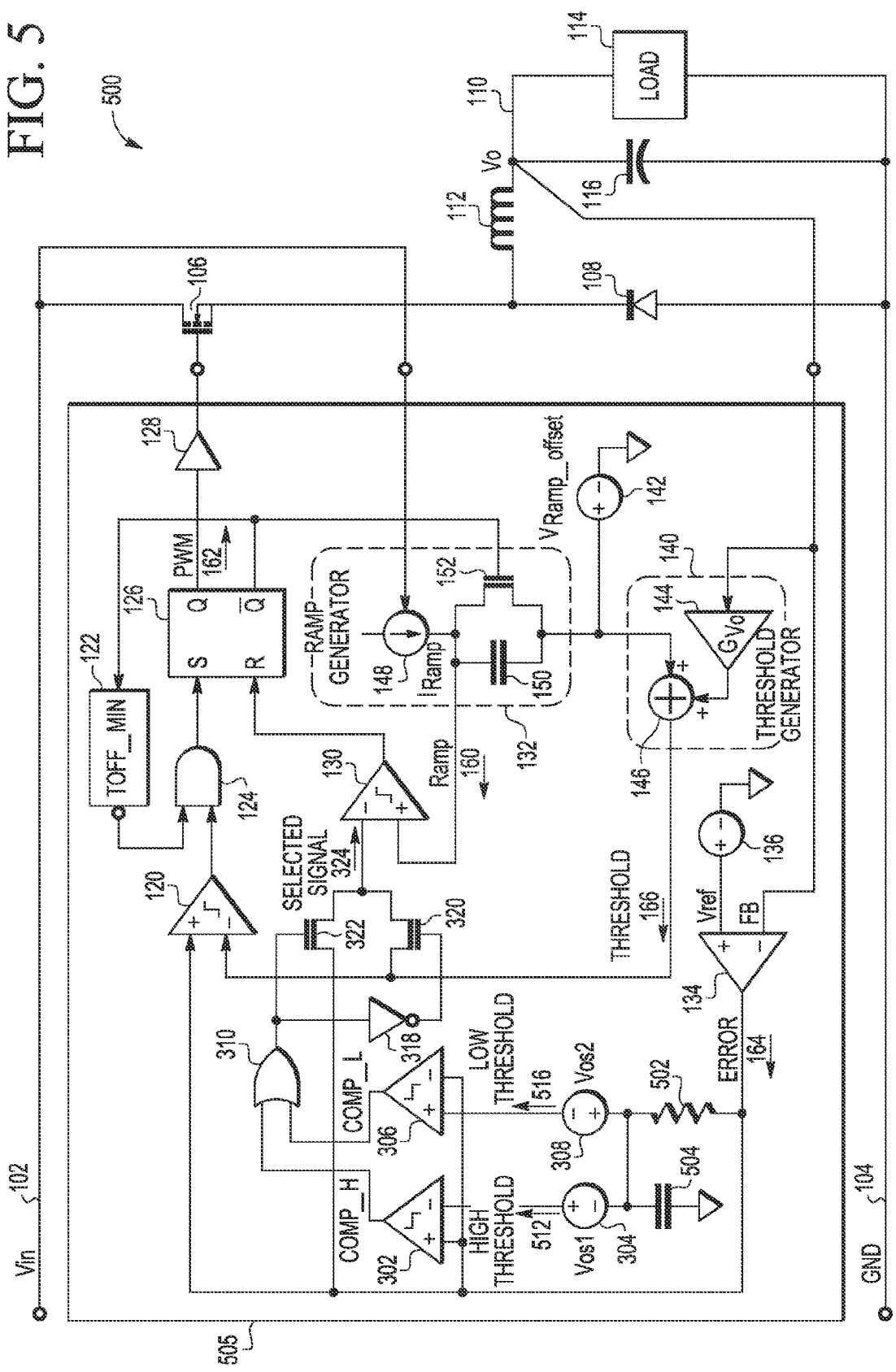
FIG. 5 is a diagram of a second embodiment of a portion of a power supply controller with enhanced ramp pulse modulation.

FIG. 5 is a diagram 500 of a second embodiment of a portion of a power supply controller 505 with enhanced ramp pulse modulation. Power supply controller 505 includes the same elements as the power supply controller 305 in FIG. 3 with a slight change to the first offset voltage and second offset voltage 308 and with two additional components: a resistor 502 and a capacitor 504. Unlike power supply controller 305 where the high threshold 312 and the low threshold 316 are offset from the threshold signal 166, power supply controller 505 produces the high threshold 512 and the low threshold 516, based on first offset voltage 304 and second offset voltage 308 which are offset from an average of the error signal 164.

Power supply controller 505 includes resistor 502 including a first terminal connected to the output of error amplifier 134 and a second terminal coupled to second offset voltage 308 (Vos2). Further, power supply controller 505 includes a capacitor 504 including a first electrode connected to ground and a second electrode connected to first offset voltage 304 and to second offset voltage 308. In this instance, capacitor 504 filters the error signal 164 to produce an average. Thus, the high threshold 512 is equal to an average of the error signal 164 plus first offset voltage 304 (Vos1) and the low threshold level 516 is equal to the average of the error signal 164 minus second offset voltage 308 (Vos2).

In operation, when the error signal 164 exceeds or falls below the operating window defined by the high threshold 512 and low threshold 516, one of the comparators 302 or 306 produces a logic high signal at an input of OR gate 310, which controls the gate of transistor 322 to provide the error signal 164 to the negative input of comparator 130 as the selected signal 324. Otherwise, if the error signal 164 is within the operating window, the output of OR gate 310 is at a logic low level, turning off transistor 322 and turning on transistor 320 to provide the threshold signal 166 to the negative input of comparator 130. Thus, when the error signal 164 is out of the operating window, the error signal 164 and the ramp signal 160 determine the pulse width. Otherwise, the threshold signal 166 and the ramp signal 160 determine the pulse width.

While the above-example used an average of the error signal 164 to produce the high threshold 512 and low threshold 516 defining the operating window, other configurations may also be used. An example of another circuit to provide such an operating window is described below with respect to FIG. 6.

Figure 6:
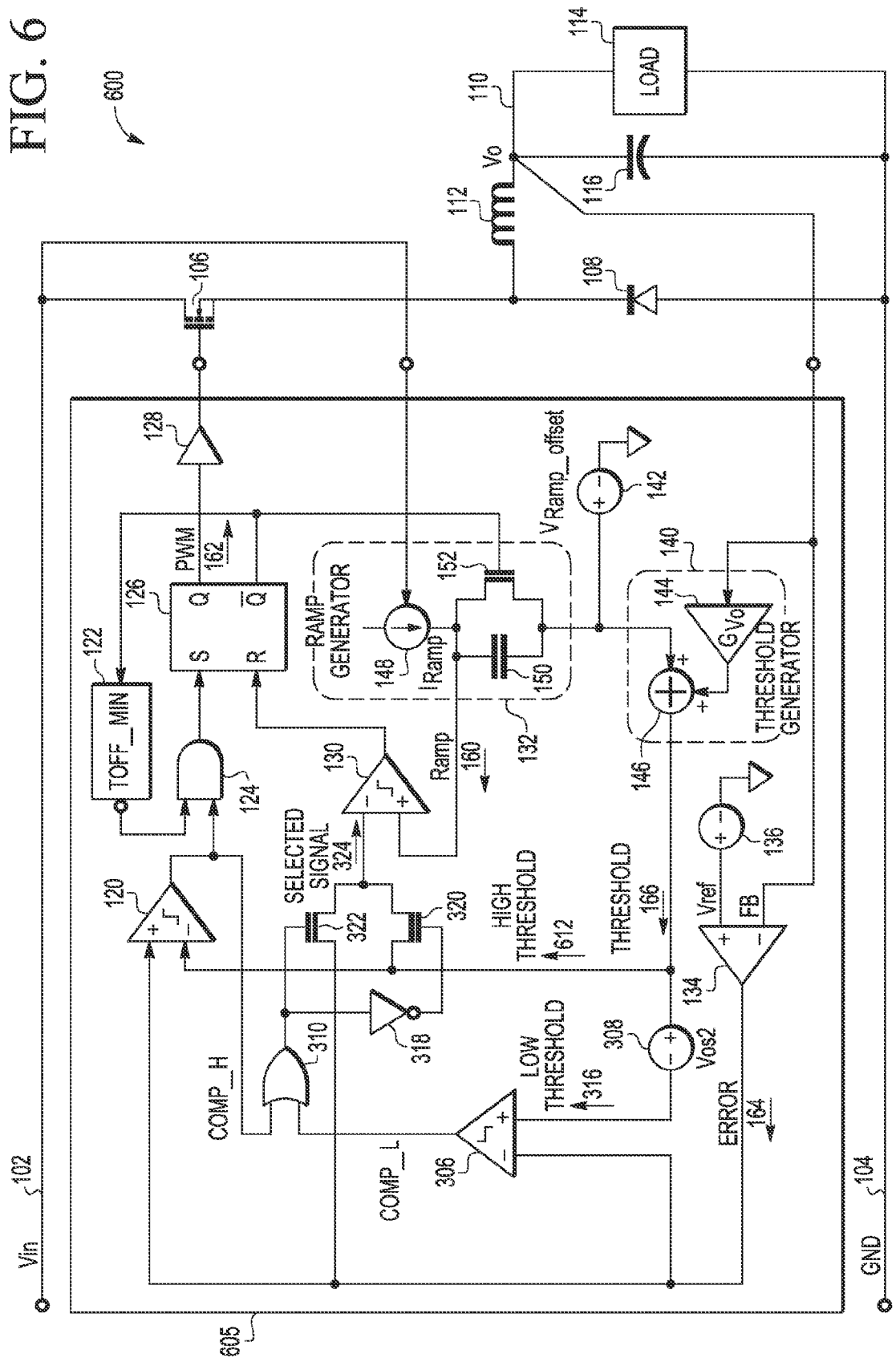
FIG. 6 is a diagram of a third embodiment of a portion of a power supply controller with enhanced ramp pulse modulation.

FIG. 6 is a diagram 600 of a third embodiment of a portion of a power supply controller 605 with enhanced ramp pulse modulation. Power supply controller 605 includes many of the same components as power supply control system 300 depicted in FIG. 3, except that comparator 302 and first offset voltage 304 are omitted and OR gate 310 is configured differently.

Power supply controller 305 includes comparator 306, which receives the error signal 164 at a negative input and a low threshold 316 at a positive input. Comparator 306 provides a resulting output to an input of OR gate 310. The other input of OR gate 310 is connected to the output of comparator 120. Comparator 120 receives error signal 164 at a positive input and a threshold signal 166 (which is treated as the high threshold 612) at a negative input of comparator 120. Comparator 120 produces a logic high value at its output when the error signal 164 exceeds the threshold signal 166. Comparator 306 produces a logic high value at its output when the error signal 164 falls below the low threshold 316.

In operation, the threshold signal 166 is used as the high threshold 612. The selected signal 324 tracks the threshold signal 166 when the error signal 164 is within the operating window between the low threshold 316 and the high threshold 612. When the error signal 164 falls below the low threshold 316 or rises above the high threshold 612, the selected signal 324 tracks the error signal 164.

While the above-described embodiments have described voltage-mode embodiments of power supply controllers 305, 505, and 605 in FIGS. 3, 5, and 6, current-mode embodiments are also possible. One possible example out of many possible examples of a current-mode implementation is described below with respect to FIG. 7.

Figure 7:
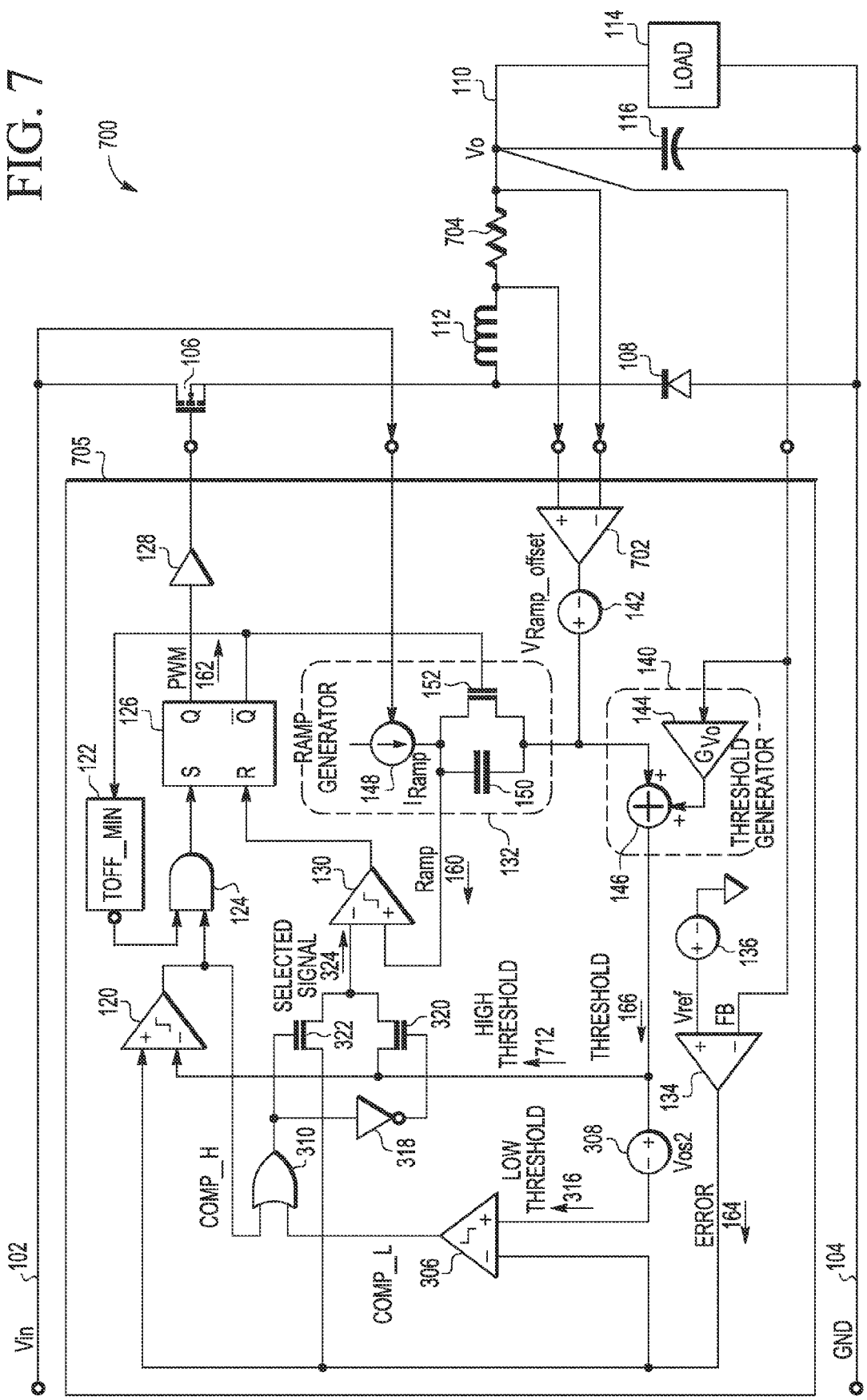
FIG. 7 is a diagram of a fourth embodiment of a portion of a power supply controller with enhanced ramp pulse modulation.

FIG. 7 is a diagram 700 of a fourth embodiment of a portion of a power supply controller 705 with enhanced ramp pulse modulation. In this embodiment, power supply controller 705 is the same as power supply controller 605 in FIG. 6, with the addition of an amplifier 702. Diagram 700 includes a sense resistor 704 connected between inductor 112 and the load circuit 114. Amplifier 702 includes a first input connected to a first terminal of resistor 704 and a second input connected to a second terminal of resistor 704 to determine a sense voltage. Amplifier 702 provides the sense voltage to offset voltage 142, which is provided to summing node 146 to produce the threshold signal 166.

The inner loop that includes the current-sense amplifier 702, the threshold generator 140, and the ramp generator 132 simplify the compensation design, especially for applications with ceramic output capacitors. In operation, the load current has no impact on the on time since the threshold signal 166 has the same bias as the ramp signal 160. As compared to a peak current-mode control, power supply controller 705 works in real current-mode, and thus is free of sub-harmonic issues.

In conjunction with the circuits depicted in FIGS. 3 and 5-7 and the timing diagram depicted in FIG. 4, a power supply controllers are described that include a latch configured to provide a PWM output signal. The power supply controllers include a first comparator including an output coupled to a first input of the PWM latch and responsive to an error signal and a threshold signal to initiate PWM pulses. The PWM controller includes a second comparator coupled to a second input of the PWM latch. The second comparator compares a ramp signal to a selected one of the error signal and the threshold signal to produce a logic signal that is provided to the second input. The PWM controller includes control circuitry configured to selectively provide one of the error signal and the threshold signal to the second comparator. In an embodiment, the controller selectively provides the error signal or the threshold signal to the second comparator based on a comparison between the error signal and an operating window defined by high and low thresholds.

Although the subject matter has been described with reference to particular illustrative embodiments, workers skilled in the art will recognize that changes may be made in form and detail without departing from the scope of the invention.

What is claimed is:

1. A power supply control circuit comprising:
   a latch including a first latch input for receiving a first logic signal, a second latch input for receiving a second logic signal, and a latch output for providing an output signal; and
   a controller coupled to the first and second latch inputs, the controller configured to generate the first logic signal based on an error signal and a threshold signal and in response to an off-time signal to control timing of a pulse in the output signal, the controller further configured to select one of the error signal and the threshold signal and to generate the second logic signal based on a ramp signal and the one of the error signal and the threshold signal to control a width of the pulse.

2. The power supply control circuit of claim 1, wherein the controller further comprises:
   a first comparator for producing a first comparator output signal in response to receiving the error signal and the threshold signal;
   a timing circuit configured to generate the off time signal defining an off time between pulses of the output signal; and
   an AND gate including a first input for receiving the first comparator output signal and a second input for receiving the off time signal, the AND control electrode including an output coupled to the first latch input for providing the first logic signal.

3. The power supply control circuit of claim 2, wherein the controller further comprises a second comparator including a first input for receiving the ramp signal and a second input for receiving one of the error signal and the threshold signal, the second comparator including an output coupled to the second latch input for providing the second logic signal.

4. The power supply control circuit of claim 3, wherein the controller further comprises:
   a first transistor including a first current electrode for receiving the error signal, a control electrode, and a second current electrode coupled to the second input of the second comparator;
   a second transistor including a first current electrode for receiving the threshold signal, a control electrode, and a second current electrode coupled to the second input of the second comparator;

an inverter including a first terminal coupled to the control electrode of the first transistor and a second terminal coupled to the control electrode of the second transistor; and an OR gate including a first OR input for receiving a first signal indicating a first result of a first comparison between the error signal and a high threshold, a second OR input for receiving a second signal indicating a second result of a second comparison between the error signal and a low threshold, and an OR output coupled to the control electrode of the first transistor.

5. The power supply control circuit of claim 4, wherein the high threshold and the low threshold are proportional to the threshold signal.

6. The power supply control circuit of claim 4, wherein the high threshold and the low threshold are proportional to the error signal.

7. The power supply control circuit of claim 4, wherein the first signal is the first comparator output.

8. A power supply control circuit comprising:
a driver circuit including an input and an output, the output configurable to couple to a control electrode of a transistor;
a latch circuit including a first latch input, a second latch input, and a latch output coupled to the input of the driver circuit; and
a control circuit coupled to the first and second latch inputs, the control circuit to provide a first signal to the first latch input based on a first comparison of an error signal to a threshold signal, the control circuit to provide a second signal to the second latch input based on a second comparison between a ramp signal and a selected one of the error signal and the threshold signal.

9. The power supply control circuit of claim 8, wherein the control circuit compares the ramp signal and the threshold signal when the error signal is within an operating window between a first threshold and a second threshold.

10. The power supply control circuit of claim 9, wherein the control circuit compares the ramp signal and the error signal when the error signal is not within the operating window.

11. The power supply control circuit of claim 9, further comprising a threshold generator configured to receive an output voltage and to generate the threshold signal in response to the output voltage.

12. The power supply control circuit of claim 11, wherein the first threshold and the second threshold are proportional to the threshold signal.

13. The power supply control circuit of claim 11, wherein the first threshold and the second threshold are derived proportional to the error signal.

14. The power supply control circuit of claim 8, further comprising:
an error amplifier including a first input for receiving an output voltage, a second input for receiving a reference voltage, and an output for providing the error signal in response to receiving the output voltage and the reference voltage.

15. A power supply control circuit comprising:
a first comparator including a first input for receiving an error signal, a second input for receiving a threshold signal, and an output for providing a first comparator output;
an AND gate including a first AND input for receiving a timing signal, a second AND input for receiving the first comparator output, and an AND output for providing a first logic signal;
a second comparator including a first input for receiving a ramp signal, a second input for receiving a selected one of the error signal and the threshold signal, and an output for providing a second logic signal; and
a latch including a first latch input for receiving the first logic signal, a second latch input for receiving the second logic signal, and a latch output for providing an output signal having a pulse with a transition edge defined by the first logic signal and a width defined by the second logic signal.

16. The power supply control circuit of claim 15, further comprising a off time circuit including an input coupled to the latch and an output coupled to the first AND input for providing the timing signal defining a time between pulses of the output signal.

17. The power supply control circuit of claim 15, further comprising:
a controller configured to determine the selected one of the error signal and the threshold signal based on a comparison of the error signal to an operating window defined by a high threshold and a low threshold;
wherein the controller provides the threshold signal to the second input of the second comparator when the error signal is within the operating window; and
wherein the controller provides the error signal to the second input of the second comparator when the error signal is outside of the operating window.

18. The power supply control circuit of claim 17, wherein the controller comprises:
a third comparator to produce a high threshold comparator output in response to receiving the error signal and a high threshold;
a fourth comparator to produce a low threshold comparator output in response to receiving the error signal and a low threshold;
an OR gate including a first OR input for receiving the high threshold comparator output, a second OR input for receiving the low threshold comparator output, and an OR output for providing a control signal; and
a switch responsive to the control signal to provide the selected one of the error signal and the threshold signal to the second input of the second comparator.

19. The power supply control circuit of claim 17, wherein the high threshold and the low threshold are proportional to the threshold signal.

20. The power supply control circuit of claim 17, wherein the high threshold and the low threshold are proportional to the error signal.

* * * * *